United States Patent [19]
Kondo

[11] Patent Number: 5,440,234
[45] Date of Patent: Aug. 8, 1995

[54] FAULT DETECTING CIRCUIT INCORPORATED IN SEMICONDUCTOR SENSOR AND EFFECTIVE AGAINST ANY FAULT HAVING INFLUENCE ON OUTPUT VOLTAGE OF A CIRCUIT COMPONENT OF THE SENSOR

[75] Inventor: Yuji Kondo, Tokyo, Japan
[73] Assignee: NEC Corporation, Tokyo, Japan
[21] Appl. No.: 134,029
[22] Filed: Oct. 7, 1993

[30] Foreign Application Priority Data
Oct. 7, 1992 [JP] Japan .................................. 4-268294

[51] Int. Cl.⁶ .......................................... G01R 31/08
[52] U.S. Cl. .................................. 324/526; 324/706; 340/650
[58] Field of Search ............... 324/522, 526, 549, 648, 324/706, 725; 307/10.1, 120, 121; 340/436, 438, 650, 652

[56] References Cited
U.S. PATENT DOCUMENTS

| | | | |
|---|---|---|---|
| 3,818,330 | 6/1974 | Hiroshima et al. | 324/549 |
| 4,956,631 | 9/1990 | Itoh | 340/436 |
| 5,122,780 | 6/1992 | Midorikawa et al. | 340/436 |
| 5,166,880 | 11/1992 | Furui | 340/436 |
| 5,208,484 | 5/1993 | Okano et al. | 307/10.1 |

FOREIGN PATENT DOCUMENTS
444866 11/1986 European Pat. Off. .
63-132171 10/1988 Japan .

*Primary Examiner*—Kenneth A. Wieder
*Assistant Examiner*—Christopher M. Tobin

[57] ABSTRACT

A semiconductor sensor has piezo resistor elements formed in deformable semiconductor portions for forming a Wheatstone bridge circuit, and a fault detecting circuit is associated with the Wheatstone bridge circuit for producing a warning signal indicative of occurrence of a fault in the Wheatstone bridge circuit, wherein the fault detecting circuit has two pairs of window comparators independently monitoring two output nodes of the Wheatstone bridge circuit to see whether or not the voltage level at each of the output nodes ranges between the upper limit and the lower limit of a normal voltage range so that a destruction of one of the piezo resistor elements is detectable.

4 Claims, 3 Drawing Sheets

FAULT DETECTING CIRCUIT INCORPORATED IN SEMICONDUCTOR SENSOR AND EFFECTIVE AGAINST ANY FAULT HAVING INFLUENCE ON OUTPUT VOLTAGE OF A CIRCUIT COMPONENT OF THE SENSOR

BACKGROUND OF THE INVENTION

This invention relates to a fault detecting circuit and, more particularly, to a fault self-detecting circuit incorporated in a semiconductor sensor for detecting a fault of a circuit component of the semiconductor sensor.

DESCRIPTION OF THE RELATED ART

A semiconductor sensor, such as an acceleration sensor or a pressure sensor, usually incorporates a lever or a thin film, aluminum wirings and resistor elements therein. These components are breakable, and the semiconductor sensor is usually equipped with a fault detecting circuit for warning a person of the fault.

A typical example of the fault detecting circuit incorporated in the semiconductor sensor is illustrated in FIG. 1 of the drawings, and the fault detecting circuit aims at detection of a disconnection of the wiring, a disconnection of the resistor element and a breakage of the silicon thin film.

The semiconductor sensor comprises a semiconductor thin film (not shown), a bridge circuit 1, a temperature compensating circuit 2 and a fault detecting circuit 3. The bridge circuit 1 is implemented by four resistor elements 1a, 1b, 1c and 1d, and is powered at power supply nodes P1 and P2. When force is exerted on the semiconductor thin film, the semiconductor thin film is deformed, and the resistor elements 1a told unequally vary. As a result, a potential difference is varied, and is taken out from a pair of output nodes OUT.

The power node P1 is connected through the temperature compensating circuit 2 with a power supply terminal Vcc, and the other power node P2 is directly connected with a ground terminal. The temperature compensating circuit 2 has temperature characteristics inverse to the temperature characteristics of the bridge circuit 1, and modifies the power voltage level Vcc depending upon the environmental temperature. Therefore, the variation due to the temperature at the output nodes OUT is compensated by the variation of a driving voltage level Vb or the power voltage supplied from the temperature compensating circuit 2 to the bridge circuit 1, and the potential difference is exactly representative of the force exerted to the semiconductor thin film.

The fault detecting circuit 3 comprises a series of resistor elements 3a and 3b connected between the power supply terminal Vcc and the ground terminal GND and a comparator 3c. The resistor elements 3a and 3b produces a reference voltage signal Vref at the common node N1 thereof, and the reference voltage signal Vref is supplied to the inverted node of the comparator 3c. The output node N2 of the temperature compensating circuit 2 is connected with the non-inverted node of the comparator 3c, and the driving voltage level Vb is supplied to the comparator 3c. The comparator 3c compares the driving voltage level VB with the reference voltage signal Vref, and produces a warning signal WRN when the driving voltage level Vb exceeds the reference voltage signal Vref.

For example, the temperature compensating circuit 2 is assumed to produce the driving voltage level Vb of 3 volts from Vcc at a standard temperature, and the temperature characteristics of the bridge circuit 1 is assumed to be equivalent to variation of the driving voltage level Vb at +15% between −40° C. and +90° C. The temperature compensating circuit 2 is expected to change the driving voltage level between 2.53 volts and 3.45 volts. If the reference voltage signal Vref is regulated to 4.0 volts, the comparator 3c keeps the warning signal WRN inactive low as long as any fault does not take place. However, if the bridge circuit 1 is disconnected from the temperature compensating circuit 2 due to, for example, a break of the wiring therebetween, the driving voltage level Vb goes up as high as the power voltage level Vcc, and the non-inverted node becomes higher than the inverted node. As a result, the comparator 3c changes the warning signal WRN to the high voltage level, and informs a person of the fault.

The fault detecting circuit thus arranged monitors the driving voltage level Vb, and checks whether or not a fault takes place. The prior art fault detecting circuit can find a disconnection between the power nodes P1 and P2. However, it is impossible to detect any fault without any influence on the driving voltage level Vb. For example, If one of the resistor elements 1a to 1d or the wiring between the resistor elements 1a and 1c or between the resistor elements 1b and 1d is broken, the bridge circuit 1 still propagates the driving voltage from the power node P1 to the power node P2, and the fault detecting circuit 3 can not find the fault. Of course, if both resistor elements 1a and 1c or the other resistor elements 1b and 1d are simultaneously broken, the fault detecting circuit also can not find the fault. Moreover, if the wiring between the bridge circuit 1 and any one of the output terminals OUT is disconnected, the warning signal WRN does not warn a person or another device of the fault.

SUMMARY OF THE INVENTION

It is therefore an important object of the present invention to provide a semiconductor sensor which is equipped with a fault detecting circuit effective against various faults of a Wheatstone bridge circuit.

To accomplish the object, the present invention proposes to independently monitor the output nodes of a Wheatstone bridge circuit to see whether or not the voltage levels thereat remain in a normal voltage range.

In accordance with the present invention, there is provided a semiconductor sensor comprising: a) a sensor unit fabricated on a semiconductor body having impurity regions formed in deformable semiconductor portions of the semiconductor body and respectively providing piezo resistor elements connected in such a manner as to form a Wheatstone bridge circuit coupled between first and second sources of power voltage; and b) a fault detecting circuit having a first comparator having a first inverted node connected with a first output node of the Wheatstone bridge circuit and a first non-inverted node, and shifting a first output signal from a high level to a low level when the voltage level at the first non-inverted node becomes higher than at the first inverted node, a second comparator having a second inverted node and a second non-inverted node connected with the first output node of the Wheatstone bridge circuit, and shifting a second output signal from the high level to the low level when the voltage level at the second non-inverted node becomes higher than that at the second inverted node, the output node of the first comparator being connected with the output node of the second comparator, a third comparator having a third inverted node connected with a second output node of the Wheatstone bridge circuit and a third non-inverted node, and shifting a third output signal from a high level to a low level when the voltage level at the third non-inverted node becomes higher than that at the third inverted node, a fourth comparator having a fourth inverted node and a fourth non-inverted node connected with the second output node of the Wheatstone bridge circuit, and shifting a fourth output signal from the high level to the low level when the voltage level at the fourth non-inverted node becomes higher than the fourth inverted node, the output node of the third comparator being connected with the output node of the fourth comparator, the output nodes of the first to fourth comparators being connected with a monitor node, a first reference voltage generator for producing first and second reference voltage signals respectively supplied to the non-inverted node of the first comparator and the inverted node of the second comparator, a first highly resistive element coupled between the first output node of the Wheatstone bridge circuit and one of the sources of the power voltage, a second reference voltage generator for producing third and fourth reference voltage signals respectively supplied to the non-inverted node of the third comparator and the inverted node of the fourth comparator, and a second highly resistive element coupled between the second output node of the Wheatstone bridge circuit and the one of the sources of the power voltage.

BRIEF DESCRIPTION OF THE DRAWINGS

The features and advantages of the semiconductor sensor according to the present invention will be more clearly understood from the following description taken in conjunction with the accompanying drawings in which.

DESCRIPTION OF THE PREFERRED EMBODIMENT

Figure 1:
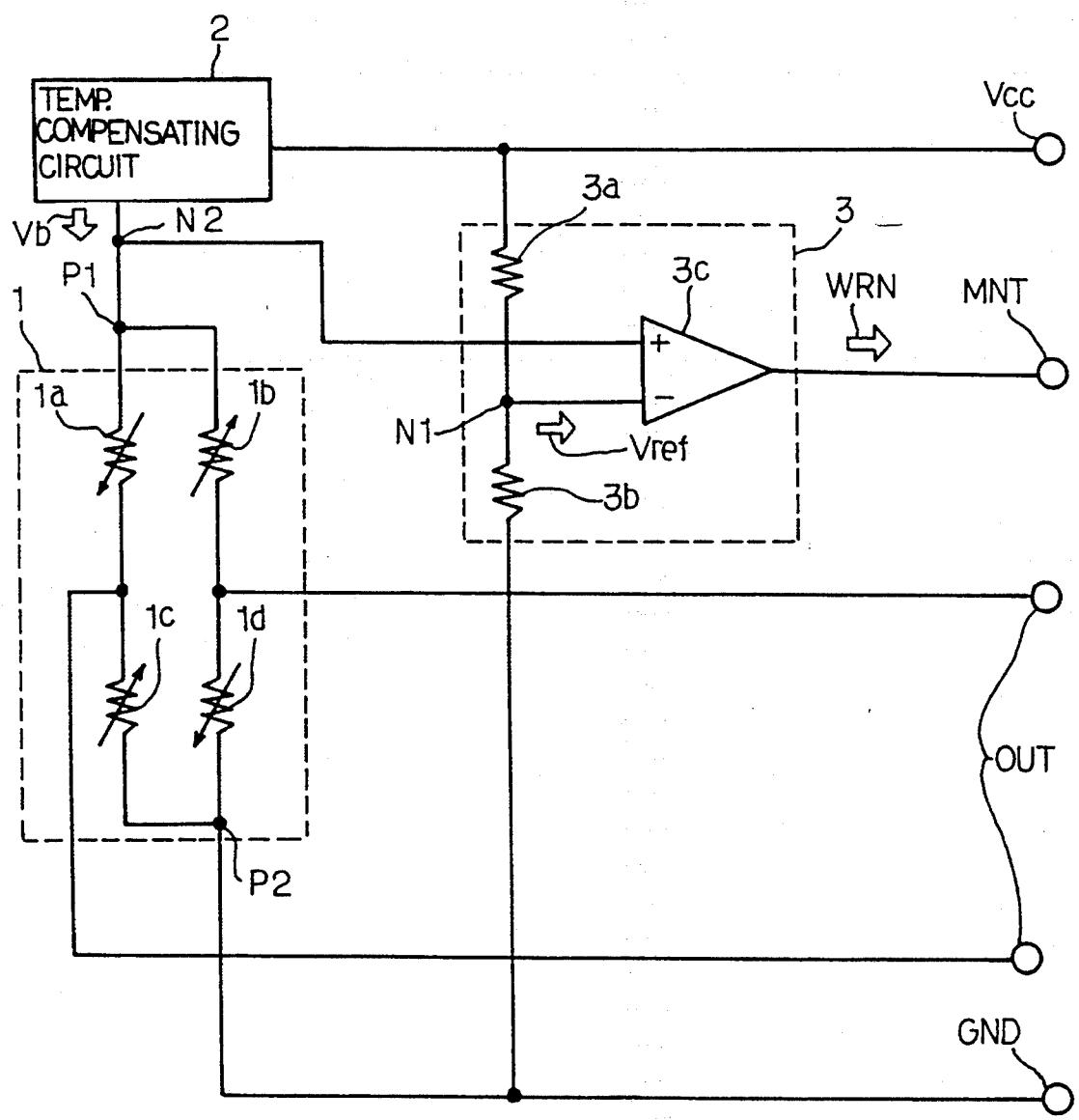
FIG. 1 is a circuit diagram showing the arrangement of the prior art semiconductor sensor.
Figure 2:
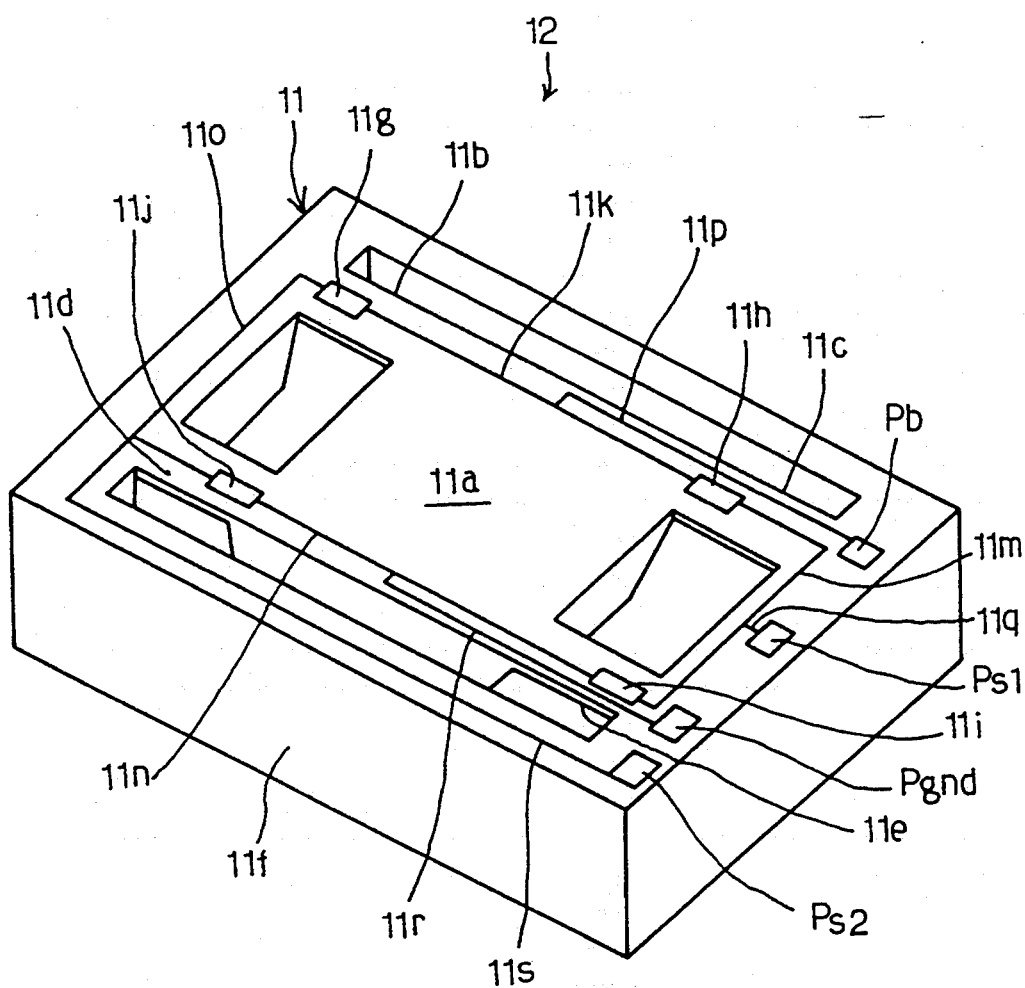
FIG. 2 is a perspective view showing the structure of a semiconductor sensor according to the present invention.

Referring to FIG. 2 of the drawings, a semiconductor acceleration sensor embodying the present invention is fabricated on a semiconductor substrate 11. The semiconductor substrate 11 is partially etched away, and a weight portion 11a is supported through four beams 11b, 11c, 11d and 11e by a frame portion 11f. Impurity regions 11g, 11h, 11i and 11j of one conductivity type are formed in the beams 11b to 11e of the opposite conductivity type, and are connected with aluminum wiring strips 11k, 11m, 11n and 11o. The aluminum wiring strips 11k to 11o in turn are connected through aluminum wiring strips 11p, 11q, 11r and 11s with pads Pb, Ps1, Pgnd and Ps2, respectively. The impurity regions 11g to 11j serve as piezo resistor elements, and the aluminum wiring strips 11g to 11j and the aluminum wiring strips 11k to 11s are arranged to form a Wheatstone bridge circuit 12. The pads Pb and Pgnd serve as power nodes of the Wheatstone bridge circuit 12, and the pads Ps1 and Ps2 provide a pair of output nodes.

When acceleration is exerted on the weight portion 11a, the beams 11b to 11e unequally deform, and, accordingly, unbalance takes place between the resistances of the impurity regions 11g to 11j. As a result, the Wheatstone bridge circuit 12 changes a potential difference between the pads Ps1 and Ps2.

Figure 3:
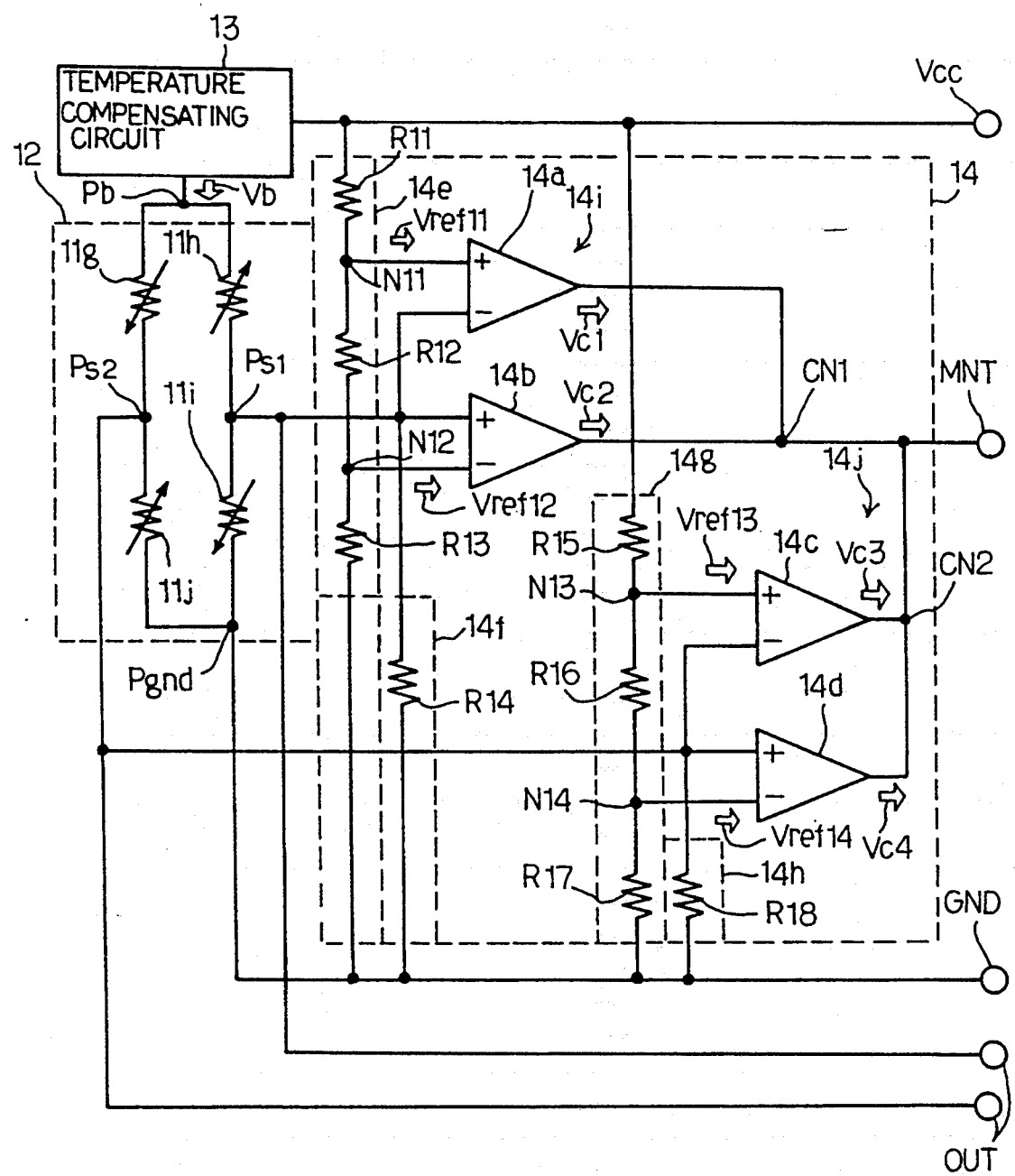
FIG. 3 is a circuit diagram showing the circuit arrangement of the semiconductor sensor according to the present invention.

Turning to FIG. 3 of the drawings, the pad Pb of the Wheatstone bridge circuit 12 is connected through a temperature compensating circuit 13 with a power supply terminal Vcc, and the other pad Pgnd is directly connected with a ground terminal GND. The remaining pads Ps1 and Ps2 are connected with a pair of output terminals OUT similarly to the prior art semiconductor sensor. The temperature compensating circuit 13 behaves similarly to that of the prior art semiconductor sensor 2, and supplies a driving voltage level Vb to the pad Pb of the Wheatstone bridge circuit 12.

A fault detecting circuit 14 according to the present invention is associated with the Wheatstone bridge circuit 12. The fault detecting circuit 14 comprises a first comparator 14a, a second comparator 14b, a third comparator 14c, a fourth comparator 14d, a first reference voltage generator 14e, a first level-shifter 14f, a second reference voltage generator 14g and a second level-shifter 14h.

The first comparator 14a is paired with the second comparator 14b for forming a first monitoring circuit 14i, and the output node Ps1 is connected with the inverted node of the first comparator 14a and the non-inverted node of the second comparator 14b. When the input voltage level at the non-inverted node becomes higher than the input voltage level at the inverted-node, the first and second comparators 14a and 14b change respective output signals from high voltage level to low voltage level. The comparators 14a and 14b thus arranged are referred to as "window comparator". The output nodes of the first and second comparators 14a and 14b are connected at a common node CN1, and the output signal Vc1 of the comparator 14a is added with the output signal Vc2 of the comparator 14b.

Similarly, the third comparator 14c is paired with the fourth comparator 14d for forming a second monitoring circuit 14j; the other output node Ps2 is connected with the inverted node of the third comparator 14c and the non-inverted node of the fourth comparator 14d. When the input voltage level at the non-inverted node becomes higher than the input voltage level at the inverted-node, the third and fourth comparators 14c and 14d change respective output signals from high voltage level to low voltage level, and, for this reason, the comparators 14c and 14d are also form "the window comparator". The output nodes of the third and fourth comparators 14c and 14d are connected at a common node CN2, and the output signal Vc3 of the comparator 14c is added with the output signal Vc4 of the comparator 14d. The output nodes of all the comparators 14a to 14d are connected at a monitor node MNTo The first reference voltage generator 14e is implemented by a series of resistors R11, R12 and R13, and produces first and second reference voltages Vref11 and Vref12 at respective nodes N11 and N12 between the resistors R11 and R12 and between the resistors R12 and R13. The first and second reference voltages Vref11 and Vref12 are supplied to the non-inverted node of the first comparator 14a and the inverted node of the second comparator 14b, respectively.

The first level-shifter 14f is implemented by a resistor R14 which is twenty at least times larger in resistance than each of the resistor elements 11g to 11j, and is coupled between the output node Ps1 and a ground voltage line.

The second reference voltage generator 14g is implemented by a series of resistors R15, R16 and R17, and produces third and fourth reference voltages Vref13 and Vref14 at respective nodes N13 and N14 between the resistors R15 and R16 and between the resistors R16 and R17. The third and fourth reference voltages Vref13 and Vref14 are supplied to the non-inverted node of the third comparator 14c and the inverted-node of the fourth comparator 14d, respectively.

The second level-shifter 14h is implemented by a resistor R18 with extremely larger resistance than that of each of the resistor elements 11g to 11j, and is coupled between the output node Ps1 and the ground voltage line.

The normal voltage range of the Wheatstone bridge circuit 12 is assumed to be a half of the driving voltage level Vb±15%. Since the driving voltage level Vb is adjusted to 3 volts at a standard temperature, and the normal voltage range is theoretically set to 1.5 volts±225 millivolts, i.e., 1.275 volts to 1.725 volts. However, a margin should be taken into account, because the resistance of a resistor is not exactly adjusted to a target value. For this reason, the normal voltage range is set to 1.2 volts to 1.8 volts. In this situation, the output voltage signals Vc1 and Vc2 as well as the voltage level at the common node CN1 vary depending upon the voltage level at the output node Ps1 as shown in Table 1.

Table 1

| Output Node Ps1 (volt) | Vc1 (volt) | Vc2 (volt) | Common Node CN1 (volt) |
| --- | --- | --- | --- |
| Ps1 > 1.8 | Low | High | Low |
| 1.8 > Ps1 > 1.2 | High | High | High |
| 1.2 > Ps1 | High | Low | Low |

As described hereinbefore, two pairs of window comparators 14a to 14d are incorporated in the fault detecting circuit 14. The first and third comparators 14a and 14c monitor the output nodes Ps1 and Ps2 to see whether or not the voltage levels thereat exceed the upper limit of the normal voltage range, and the second and fourth comparators 14b and 14d monitor the output nodes Ps1 and ps2 to see whether or not the voltage level thereat become lower than the lower limit of the normal voltage range. Thus, the window comparators 14a to 14d independently monitor the voltage level at the output nodes Ps1 and Ps2 to see whether or not the voltage levels thereat remain in the normal voltage range, and any abnormal voltage level at the output node Ps1 or PS2 results in a voltage shift at the monitor node MNT, because the window comparators 14a to 14d are added with one another. As a result, if destruction takes place in one of the piezo resistor elements 11g to 11j or one of the aluminum wirings, the fault detecting circuit 14 produces and supplies a warning signal to the monitor node MNT. Table 2 illustrates detectable faults and the fault origins.

Table 2

| No. | Fault | Origin |
| --- | --- | --- |
| 1 | disconnection of a wiring | any one of aluminum wiring strips |
| 2 | disconnection of a resistor element | any one of impurity regions |
| 3 | destruction of a beam | any one of beams |

Table 2-continued

| No. | Fault | Origin |
| --- | --- | --- |
| 4 | disconnection of a wire | any one of pads |

Assuming now that the piezo resistor element 11h or the wiring between the nodes Pb and Ps1 is disconnected, the output node Ps1 discharges current through the resistor R14 to the ground voltage line, and becomes equal at its level to the ground voltage level. The voltage level at the output node Ps1 is lower than the lower limit of the normal voltage range, and the comparators 14a and 14b supply the output signal Vc1 of the high level and the output signal Vc2 of the low level respectively to the common node CN1, respectively. Then, the output signal Vc1 is added with the output signal Vc2, and the monitor node MNT is changed to the low level indicative of occurrence of the fault.

If the piezo resistor element 11i or the wiring between the voltage level at the nodes Ps1 and Pgnd is disconnected, the output node Ps1 goes up, and becomes equal to the driving voltage level Vb. The voltage level at the output node Ps1 exceeds the upper limit of the normal voltage range, and the first and second comparators 14a and 14b produce the output signal Vc1 of the low level and the output signal Vc2 of the high level. The output signal Vc1 is added with the output signal Vc2, and the monitor node MNT is changed to the low level indicative of occurrence of the fault.

When a disconnection takes place between the output node Ps1 or Ps2 and one of the inverted and non-inverted nodes of the comparator, the voltage level at the inverted or non-inverted node becomes lower than the lower limit of the normal voltage range, and the fault detecting circuit 14 changes the warning signal to the low level.

Moreover, if one of the beams is broken, the respective piezo resistor element is damaged, and the fault detecting circuit 14 changes the warning signal to the low level.

As will be appreciated from the foregoing description, when a fault takes place in one of the piezo resistor elements 11g to 11j or one of the wiring strips 11k to 11s, one of the first to fourth comparators 14a to 14d detects the abnormal voltage, and shifts the warning signal to the low level indicative of the occurrence of a fault.

Although a particular embodiment of the present invention has been shown and described, it will be obvious to those skilled in the art that various changes and modifications may be made without departing from the spirit and scope of the present invention. For example, the present invention is applicable to any semiconductor sensor for converting deformation of a component member into an electric signal, and a semiconductor pressure sensor and a vibration sensor are examples of the semiconductor sensors to which the present invention appertains. Moreover, the structure of the semiconductor sensor is not limited to that shown in FIG. 2. The fault detecting circuit may be fabricated on a semiconductor substrate together with the bridge circuit and on a semiconductor substrate separated from the semiconductor substrate for the bridge circuit.

What is claimed is:

1. A semiconductor sensor comprising:
a) a sensor unit fabricated on a semiconductor body having impurity regions formed in deformable semiconductor portions of said semiconductor body and respectively providing piezo resistor elements connected in such a manner as to form a Wheatstone bridge circuit coupled between first and second sources of power voltage, said Wheatstone bridge circuit having a first output node between two of said piezo resistor elements and a second output node between other two of said piezo resistor elements; and b) a fault detecting circuit including:
- b-1) a first comparator having a first inverted node, a first non-inverted node and an output node, said first inverted node being connected with said first output node of said Wheatstone bridge circuit, said first comparator shifting a first output signal to be outputted from the output node thereof from a high level to a low level when the voltage level at said first non-inverted node becomes higher than that at said first inverted node,
- b-2) a second comparator having a second inverted node, a second non-inverted node and an output node, said second non-inverted node being connected with said first output node of said Wheatstone bridge circuit, said second comparator shifting a second output signal to be outputted from the output node thereof from the high level to the low level when the voltage level at said second non-inverted node becomes higher than that at said second inverted node, the output node of said first comparator being connected with the output node of said second comparator,
- b-3) a third comparator having a third inverted node, a third non-inverted node and an output node, said third inverted node being connected with said second output node of said Wheatstone bridge circuit, said third comparator shifting a third output signal to be outputted from the output node thereof from a high level to a low level when the voltage level at said third non-inverted node becomes higher than that at said third inverted node,
- b-4) a fourth comparator having a fourth inverted node, a fourth non-inverted node and an output node, said fourth non-inverted node being connected with said second output node of said Wheatstone bridge circuit, said fourth comparator shifting a fourth output signal to be outputted from the output node thereof from the high level to the low level when the voltage level at said fourth non-inverted node becomes higher than that at said fourth inverted node, the output node of said third comparator being connected with the output node of said fourth comparator, said output nodes of said first to fourth comparators being connected with a monitor node,
- b-5) a first reference voltage generator for producing first and second reference voltage signals respectively supplied to said first non-inverted node of said first comparator and said second inverted node of said second comparator.
- b-6) a first highly resistive element coupled between said first output node of said Wheatstone bridge circuit and one of said first and second sources of power voltage,
- b-7) a second reference voltage generator for producing third and fourth reference voltage signals respectively supplied to said third non-inverted node of said third comparator and said fourth inverted node of said fourth comparator, and
- b-8) a second highly resistive element coupled between said second output node of said Wheatstone bridge circuit and said one of said first and second sources of power voltage.

2. A semiconductor sensor as set forth in claim 1, in which further comprising a temperature compensating circuit coupled between one of said first and second sources of power voltage and a power node of said Wheatstone bridge circuit.

3. A semiconductor sensor as set forth in claim 1, in which one of said first and second reference voltage generators is implemented by a series combination of resistor elements, said series combination of resistor elements having intermediate nodes between said resistor elements, one of said intermediate nodes producing one of said first and third reference voltage signals, another of said intermediate nodes producing one of said second and fourth reference voltage signals.

4. A semiconductor sensor as set forth in claim 2, in which one of said first and second reference voltage generators is implemented by a series combination of resistor elements, said series combination of resistor elements having intermediate nodes between said resistor elements, one of said intermediate nodes producing one of said first and third reference voltage signals, another of said intermediate nodes producing one of said second and fourth reference voltage signals.

* * * * *